United States Patent
Plappert (12)

(10) Patent No.: US 11,146,689 B1
(45) Date of Patent: Oct. 12, 2021

(54) AUDIO BROADCAST SYSTEM WITH CLOUD COMMUNICATIONS PLATFORM AND RELATED METHODS

(71) Applicant: Smart Talk, LLC, Ocala, FL (US)

(72) Inventor: David Plappert, Chillicothe, IL (US)

(73) Assignee: SMART TALK, LLC, Ocala, FL (US)

( * ) Notice: Subject to any disclaimer, the term of this patent is extended or adjusted under 35 U.S.C. 154(b) by 0 days.

(21) Appl. No.: 17/152,028

(22) Filed: Jan. 19, 2021

Related U.S. Application Data

(60) Provisional application No. 63/009,631, filed on Apr. 14, 2020.

(51) Int. Cl.
*H04M 3/56* (2006.01)
*H04L 29/06* (2006.01)

(52) U.S. Cl.
CPC ........ *H04M 3/568* (2013.01); *H04L 65/4076* (2013.01); *H04L 65/60* (2013.01); *H04M 3/563* (2013.01)

(58) Field of Classification Search
CPC .... H04L 65/60; H04L 65/4076; H04M 3/563; H04M 3/568
USPC ..... 379/204.01, 67.1–88.28, 201.01; 700/94; 370/259–271, 351–357; 709/201–207, 709/217–248
See application file for complete search history.

(56) References Cited

U.S. PATENT DOCUMENTS

| | | | |
|---|---|---|---|
| 6,694,132 B1 * | 2/2004 | Lausi ................ | H04M 3/42348 379/37 |
| 6,870,916 B2 * | 3/2005 | Henrikson ............ | H04M 3/567 379/158 |
| 6,876,734 B1 * | 4/2005 | Summers ............ | H04L 12/1818 370/260 |
| 6,944,136 B2 * | 9/2005 | Kim ...................... | H04N 7/173 370/260 |
| 7,483,945 B2 * | 1/2009 | Blumofe ............. | H04L 12/1818 379/201.12 |
| 7,523,203 B1 * | 4/2009 | Nguyen .............. | H04L 65/1046 370/260 |
| 7,599,355 B2 | 10/2009 | Sunstrum | |
| 7,990,948 B2 | 8/2011 | Goroshevsky et al. | |
| 8,767,591 B2 * | 7/2014 | Yang ................... | H04L 12/1822 370/260 |

(Continued)

OTHER PUBLICATIONS

Amazon "AWS Lambda" https://aws.amazon.com/lambda/ retrieved from internet Jan. 3, 2021; pp. 1.

(Continued)

*Primary Examiner* — Hemant S Patel
(74) *Attorney, Agent, or Firm* — Allen, Dyer, Doppelt + Gilchrist, PA

(57) ABSTRACT

An audio broadcast system may include communications devices, a cloud communications platform in communication with the communications devices, and an event-driven serverless cloud computing platform in communication with the communications devices and the cloud communications platform. The event-driven serverless cloud computing platform may be configured to provision resources from the cloud communications platform to initiate telephone calls respectively for the communications devices, and simultaneously broadcast an audio stream to the communications devices respectively via the telephone calls.

20 Claims, 12 Drawing Sheets

(56) References Cited

U.S. PATENT DOCUMENTS

| | | | |
|---|---|---|---|
| 2007/0058795 A1* | 3/2007 | Arrant | H04M 3/56 379/202.01 |
| 2007/0211705 A1 | 9/2007 | Sunstrum | |
| 2010/0246566 A1 | 9/2010 | Tsai | |
| 2018/0341502 A1 | 11/2018 | Rabasa et al. | |
| 2019/0324813 A1 | 10/2019 | Bogineni et al. | |

OTHER PUBLICATIONS

Wikipedia "AWS Lambda" https://en.wikipedia.org/wiki/aws_lambda; retrieved from internet Nov. 12, 2020; pp. 1.

* cited by examiner

- swCallCompleted
  - Hit
    - Twilio/Signalwire hits this function when a call is completed.
  - Return
    - Nothing, just a 200 status
- swCallDialout
  - Order: 3
  - Hit
    - When connecting a known phone system user to an incoming caller who selected their extension either via user or group
    - Functions: swCallMenu, swCallTransferConnect
  - Return
    - If human
      - Press 1 to accept
      - Send input to swCallDialoutConnect function
    - If voicemail
      - If group, wait for other users
      - If just signal user, send to user's phone system voicemail
        - Not their personal cellphone voicemail
- swCallDialoutConnect
  - Order: 4
  - Hit
    - After a phone user has accept an incoming phone call
    - Functions: swCallDialout
  - Return:
    - Sends the incoming caller to the swCallTransferTogether function (known = 0) with the signalwire_dequeue_call or signalwire_update_call internal ruby function.
    - Redirects the known phone user to the swCallTransferTogether function (known = 1)
- swCallFail
  - Hit
    - Twilio/Signalwire hit this function when the return from swCallIncoming is not valid. We use this to catch errors
  - Return
    - This sends me an email alerting to the error, and sends me a var dump

*FIG. 4A*

- swCallIncoming
  - Order: 1
  - Hit: First function hit when a new call is made into a phone number we host.
  - Returns: says the IVR menu
    - Outside caller: welcome, press 1/2/3
      - Send input to swCallMenu function
    - Known phone user: call out, voicemail
      - Send input to swCallUserAsk function
    - If not input is given, send to general voicemail box via swCallLeaveVoicemail function
- swCallLeaveQueue
  - *not in use*
- swCallLeaveToVoicemail
  - Order: 4
  - Hit
    - Called to start the voicemail process
    - Functions: swCallWaitQueue
  - Return
    - DeQueue's or Update's call with signalwire_dequeue_call or signalwire_update_call internal ruby functions.
    - Redirects incoming caller to the swCallLeaveVoicemail function
- swCallLeaveVoicemail
  - Order:5
  - Hit
    - Function: swCallLeaveToVoicemail
  - Return:
    - Play a voicemail greeting or say a pre-recorded message asking incoming caller to leave a voicemail
    - Record the voicemail
      - Send the voicemail information when recording is finished to the swCallVoicemail function
      - Send the recording for transcribing. When the transcribing process is completed, notifiy the swCallVoicemailTranscribe function.

*FIG. 4B*

- swCallMenu
    - Order: 2
    - Hit
        - When the digit(s) are pressed from swCallIncoming's IVR menu
        - Functions: swCallIncoming, swCallUserAsk
    - Returns:
        - If extension is group, and set to straight to voicemail: redirect to swCallLeaveVoicemail function
        - Else
            - Put user in queue with swCallWaitQueue function
            - Run make_call internal ruby function
                - Calls the user(s) at the extension
                - Upon answer of call (human or voicemail), run swCallDialout function
- swCallTransferConnect
    - Hit:
        - Function: swCallTransferEnterNumber
    - Return
        - Call the known phone user whose extension you entered via the swCallDialout function
        - Transfer the incoming caller into the conference via the swCallTransferTogether function
        - 
- swCallTransferEnterNumber
    - Order: 6
    - Hit
        - Function: swCallTransferTogether
    - Return
        - Ask the known phone user to enter a user's extension and send the input to the swCallTransferConnect function
        - While they are doing that, play some wait music for the incoming caller, via the swCallWaitTransfer function.

*FIG. 4C*

- swCallTransferTogether
  - Order: 5
  - Hit
    - This function is hit
    - Functions: swCallDialoutConnect, swCallTransferConnect
  - Returns
    - Puts the incoming caller and known phone user together into a conference. The known phone user can press the star key at any time and get the swCallTransferEnterNumber function.
- swCallUserAsk
  - Hit
    - Function: swCallIncoming
  - Return
    - If they want to dial an extension, collect input and send it to the swCallMenu function
    - If they want to record their voicemail greeting, record the greeting and send the recording to the swCallUserRecordVoicemailGreeting function
- swCallUserRecordVoicemailGreeting
  - Hit
    - Function: swCallUserRecordVoicemailGreeting
  - Return
    - Play back the new voicemail recording, tell the known phone user it has been saved, then hangup.
- swCallVoicemail
  - Order: 6
  - Hit
    - Function: swCallLeaveVoicemail
    - When a voicemail recording is completed.
  - Return: hangup – call completed.

FIG. 4D

- swCallVoicemailTranscribe
    - Order: 7
    - Hit
        - Function: swCallLeaveVoicemail
        - When a transcirbtion of a voicemail recording is completed.
    - Return:
        - Sms and eMails the transcription to the known phone users along with the recording and caller's information.
- swCallWaitQueue
    - Order: 3
    - Hit:
        - Function: swCallMenu
        - This plays nice music while the incoming caller waits for the user(s) to answer
    - Return:
        - If the music finishes playing at timeout, then send the user to leave a voicemail with the swCallLeaveToVoicemail function.
- swCallWaitTransfer
    - Hit
        - Function: swCallTransferEnterNumber
    - Return
        - Play wait music forever
- swSmsCallback
    - Hit:
        - Twilio/Signalwire when a message is sent or received successfully or not
    - Return
        - 200 status

FIG. 4E

- swSmsCompleted
  - Hit:
    - Twilio/Signalwire when a message is sent or received successfully or not
  - Return
    - 200 status
- swSmsFail
  - Hit:
    - Twilio/Signalwire when a message fails to send because of an app error
  - Return
    - Email me about error with var dump
- swSmsIncoming
  - Hit:
    - Twilio/Signalwire on incoming sms
  - Return
    - If sms is coming from a known phone user, see who text in last and send them the message
    - If the sms is coming from an unknown outsider, then send the message to those in the designated group to receive incoming text messages from the business phone line.
    - Note: that because this system is app-less, every message starts with an incoming message, and then is forwarded – both from known and unknown users.

*FIG. 4F*

LIVE STREAM: RTMP -> Servers (running NGINX & FFMPEG)
(INBOUND CALLS: Signalwire/Twilio -> Smart Talk (serverless pbx above) -> Servers (running NGINX & FFMPEG ... same as above)
On the Servers:
RTMP -> Nginx (rtmp module) live app -> push through FFmpeg (encoded audio only) to phone app
any calls then connect to the phone app to hear the audio.

This Nginx conf also communicates with our Smart Talk (serverless pbx app) to let our app know when the client is live, to send out notifications, and when they are finished, to gather and archive the audio file for playback.

Nginx.conf (private source code ... secret sauce)
user root;
worker_processes auto;

pid /run/nginx.pid;
include /etc/nginx/modules-enabled/*.conf;

error_log  logs/error.log;
error_log  logs/error.log  notice;
error_log  logs/error.log  info;

pid        logs/nginx.pid;

events {
 worker_connections 10240;
} rtmp_auto_push on;

*FIG. 5A*

```
rtmp {
 server {
  listen 1935;
  application live {
#    deny play all;
#    allow play 127.0.0.1;
   live on;
   on_play http://127.0.0.1:8080/livestream/play;
   on_publish http://127.0.0.1:8080/livestream/publish;
   on_done http://127.0.0.1:8080/livestream/done;
   on_play_done http://127.0.0.1:8080/livestream/playdone;
   on_publish_done http://127.0.0.1:8080/livestream/publishdone;
   on_record_done http://127.0.0.1:8080/livestream/recorddone;
   on_update http://127.0.0.1:8080/livestream/update;
   exec_push ffmpeg -i rtmp://127.0.0.1:1935/live/$name -ab 64000 -acodec aac -ar 44100 -ac 1 -vn -f flv rtmp://127.0.0.1:1935/phone/$name >>/var/log/nginx/ffmpeg-push-$name.log 2>&1;
   exec_publish bash -c "echo $addr $app $name >> /var/log/nginx/live-publishers 2>&1";
   exec_play bash -c "echo $addr $app $name $pageurl $swfurl >> /var/log/nginx/live-players 2>&1";
  }
  application phone {
#    deny publish all;
#    allow publish 127.0.0.1
   live on;
   record audio;
   record_path /streams;
```

*FIG. 5B*

```
   record_unique on;
      on_play http://127.0.0.1:8080/livestream/play;
      on_publish http://127.0.0.1:8080/livestream/publish;
      on_done http://127.0.0.1:8080/livestream/done;
      on_play_done http://127.0.0.1:8080/livestream/playdone;
      on_publish_done http://127.0.0.1:8080/livestream/publishdone;
      on_record_done http://127.0.0.1:8080/livestream/recorddone;
      on_update http://127.0.0.1:8080/livestream/update;
      exec_record_done bash -c "/root/scripts/exec_record_done.sh $recorder $path $filename $basename $dirname >> /var/log/nginx/execrecorddone-$basename.log 2>&1";
      exec_publish bash -c "echo $addr $app $name >> /var/log/nginx/live-publishers 2>&1";
      exec_play bash -c "echo $addr $app $name $pageurl $swfurl >> /var/log/nginx/live-players 2>&1";
    }
  }
}
http {
 server {
   listen 1938;
   ## FIX ME: Add Auth
   location /stats {
     rtmp_stat all;
   }
   location /control {
     rtmp_control all;
   }
 }
 server {
   listen 8080;
   location / {
     proxy_pass https://api.dev.phonelivestreaming.com;
   }
 }
}
```

FIG. 5C

AUDIO BROADCAST SYSTEM WITH CLOUD COMMUNICATIONS PLATFORM AND RELATED METHODS

RELATED APPLICATION

This application is based upon prior filed Application No. 63/009,631 filed Apr. 14, 2020, the entire subject matter of which is incorporated herein by reference in its entirety.

TECHNICAL FIELD

The present disclosure relates to the field of communications, and, more particularly, to a telephone system and related methods.

BACKGROUND

Telephone technology has evolved greatly since its creation in the late 1800s. In the earliest stages, phone connections were limited and manually connected. As the telephone became ubiquitous in large corporate environments, this same manual connection was used for intra-office telephone calls. For example, one approach to this intra-office application was the private branch exchange (PBX) telephone system. Even as analog equipment was phased out with Voice over Internet Protocol (VoIP) equipment, the PBX telephone systems typically included PBX proprietary and expensive hardware to operate.

In one approach, the localized hardware is omitted for a cloud based approach. In these applications, the local hardware is minimized to a desk phone, and all telephony operations are remoted to the cloud platform, such as a cloud communications platform as a service (CPaaS).

SUMMARY

Generally, an audio broadcast system may include a plurality of communications devices, a cloud communications platform in communication with the plurality of communications devices, and an event-driven serverless cloud computing platform in communication with the plurality of communications devices and the cloud communications platform. The event-driven serverless cloud computing platform may be configured to provision resources from the cloud communications platform to initiate a plurality of telephone calls respectively for the plurality of communications devices, and simultaneously broadcast an audio stream to the plurality of communications devices respectively via the plurality of telephone calls.

In some embodiments, the event-driven serverless cloud computing platform may be configured to receive the audio stream as a real time audio live stream. The event-driven serverless cloud computing platform may be configured to, when the real time audio live stream begins, provision resources from the cloud communications platform to initiate at least one notification outgoing telephone call to at least one given subscribed communications device. The event-driven serverless cloud computing platform may be configured to store the real time audio live stream, and provision resources from the cloud communications platform to initiate at least one subsequent outgoing telephone call for subsequent playback of the real time audio live stream. For example, the real time audio live stream may comprise at least one of a real-time messaging protocol (RTMP) feed and a web real-time communication (WEBRTC) feed.

Also, the plurality of telephone calls may comprise a plurality of incoming telephone calls, and a plurality of outgoing telephone calls. The event-driven serverless cloud computing platform may be configured to initiate the plurality of incoming telephone calls from a single call-in telephone number. The event-driven serverless cloud computing platform may be configured to, after initiating a given outgoing telephone call, require a user input before broadcast of the audio stream. The event-driven serverless cloud computing platform may be configured to receive the audio stream as at least one of an uploaded audio file, and an extracted audio file from an associated video file.

Another aspect is directed to a method of operating an audio broadcast system comprising a plurality of communications devices, a cloud communications platform in communication with the plurality of communications devices, and an event-driven serverless cloud computing platform in communication with the plurality of communications devices and the cloud communications platform. The method may comprise operating the event-driven serverless cloud computing platform to provision resources from the cloud communications platform to initiate a plurality of telephone calls respectively for the plurality of communications devices, and simultaneously broadcast an audio stream to the plurality of communications devices respectively via the plurality of telephone calls.

BRIEF DESCRIPTION OF THE DRAWINGS

FIGS. 4A-4F are tables of a function list for an example embodiment of a cloud telephone communications application in the communication system of FIG. 1.

FIGS. 5A-5C are code for an example embodiment of a cloud telephone communications application in the audio broadcast system of FIG. 2.

DETAILED DESCRIPTION

Figure 1:
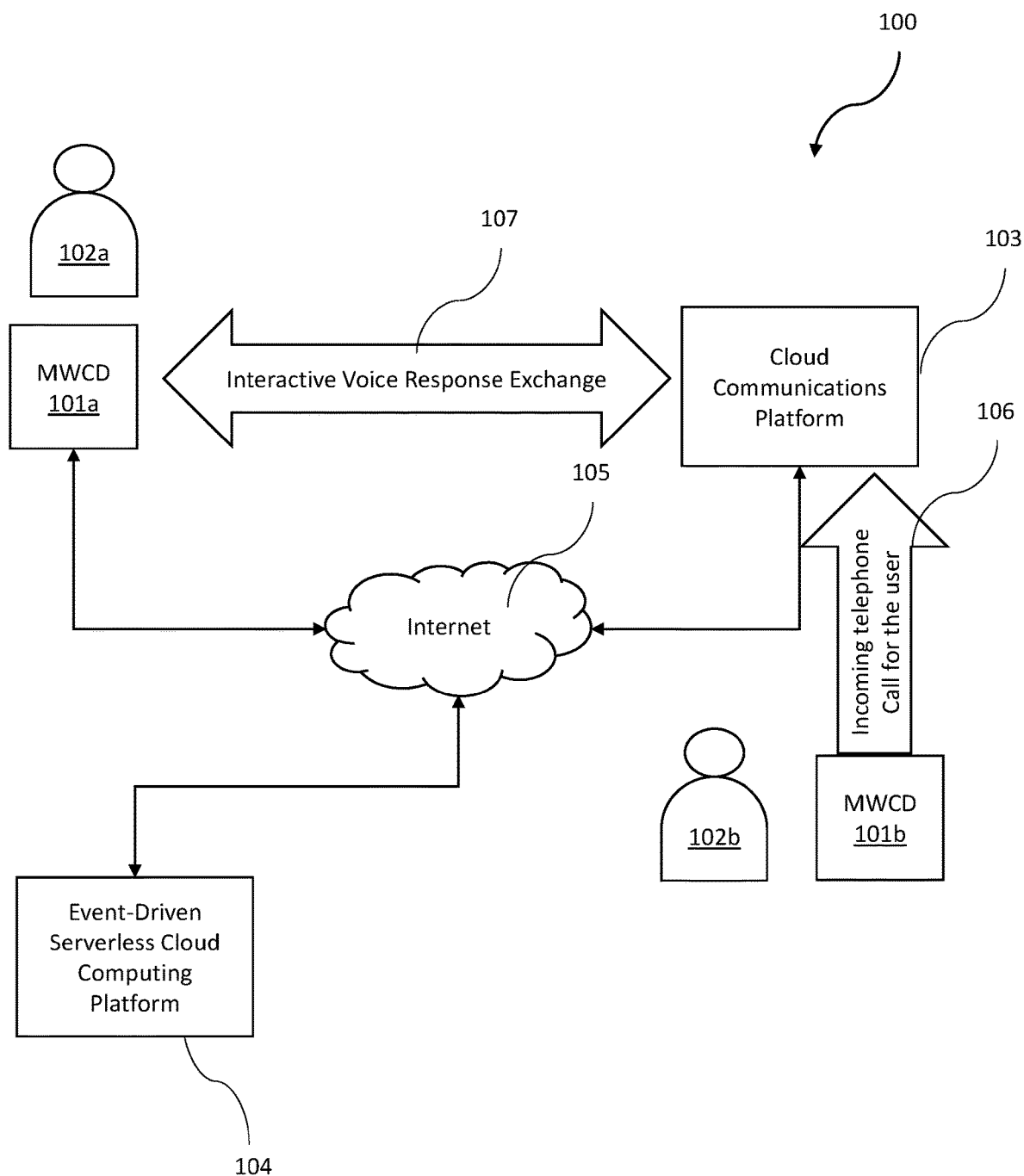
FIG. 1 is a schematic diagram of a communication system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a communication system 100 according to the present disclosure is now described. The communication system 100 includes a plurality of mobile wireless communications devices 101*a*-101*b* with respective users 102*a*-102*b*. For example, each of the plurality of mobile wireless communications devices 101*a*-101*b* may comprise a mobile device with a mobile operating system (OS) thereon, such as Android or IOS. Each mobile wireless communications device 101*a*-101*b* comprises a processor and memory cooperating therewith to provide a local telephone communications application. In some embodiments, the local telephone communications application may comprise a native application running in the mobile OS, but in other embodiments, the local telephone communications application may comprise a web based application.

The communication system 100 includes a cloud communications platform 103. For example, the cloud communications platform 103 may comprise the Twilio cloud communications platform, or the SignalWire cloud communications platform.

The communication system 100 includes an event-driven serverless cloud computing platform 104 communicating over a network 105 (e.g. the illustrated Internet) with the cloud communications platform 103 and the plurality of mobile wireless communications devices 101a-101b. For example, the event-driven serverless cloud computing platform 104 may comprise the Amazon Web Services Lambda Platform.

The event-driven serverless cloud computing platform 104 is configured to execute a cloud telephone communications application, receive a telephone voice call 106 from the mobile wireless communications device 101b via the cloud communications platform 103, provision resources from the cloud communications platform to process the telephone voice call based upon at least one input from the user 102b, and release the resources after completion of the telephone voice call.

As shown, when the telephone voice call 106 is received for the user 102a, the cloud communications platform 103 is configured to send a message to the event-driven serverless cloud computing platform 104 for the telephone voice call. For example, the message may comprise a Hypertext Transfer Protocol (HTTP) post request message. At this point, the event-driven serverless cloud computing platform 104 is configured to contact the mobile wireless communications device 101a, and generate an interactive voice response (IVR) exchange 107 for processing the telephone voice call 106. In some embodiments, the IVR exchange comprises a Private Branch Exchange interactive voice response (PBX IVR) (i.e. a full featured phone tree). In essence, the event-driven serverless cloud computing platform 104 provides the core for telephone communications for the communication system 100 by executing the cloud telephone communications application for the backend.

In some embodiments where the event-driven serverless cloud computing platform 104 comprises AWS Lambda, when an HTTP post message request comes in, via the Amazon API Gateway, a function can be stood up and executed in milliseconds. The provisioning required is that the API Gateway, and the code for the AWS Lambda functions needs to be setup. The cloud telephone communications application uses the serverless framework. Because of this, the entire phone system is almost pay-per-use.

In one embodiment, the communication system 100 may be used for another application for broadcasting an audio feed to a large number of users. In particular, in this application, an enterprise user is broadcasting an audio output (e.g. an audio live stream, or an uploaded pre-recorded audio file) to a plurality of users. In essence, the communication system 100 broadcasts the audio via a plurality of telephone calls enabled by the scalable backend. Also, for broadcast of uploaded pre-recorded audio file, the enterprise user can schedule the broadcast rather than live streaming it.

For each enterprise user, a separate call-in telephone line is assigned. The communication system 100 is configured to record each live stream event automatically. If a user calls in subsequently to the broadcast of the live stream, the audio recording is played. The communication system 100 also includes a live notification feature. When a user calls into an assigned broadcast telephone number, the user may elect to subscribe to the enterprise user's content. When the enterprise user goes live, the communication system 100 will place a notification call to the user to remind them of the new live event.

In the communication system 100, Real-Time Messaging Protocol (RTMP) or Web Real-Time Communication (WebRTC) feeds are used to encode the audio from the enterprise user into an audio feed that can be played on phone systems. Typically, most broadcasters who do live video broadcast to many platforms at the same time (e.g. Facebook, YouTube) are using RTMP (primarily) or WebRTC. With the communication system 100, the enterprise user simply drops the designated RTMP address (for the communication system 100) for them into their list of places to send their feed, and the communication system 100 can automatically send it, archive it, and use it for notifications and stats with the disclosed phone system. Advantageously, there is no extra software to install, and there is no dialing or joining per call/session.

Typically, when an audio stream is transmitted to a large group, online multicast and meeting software approaches may be used. A drawback is that each user needs to be conversant in the software being used, and needs equipment that meets the minimum requirements of the software. This can be problematic for less sophisticated users. Indeed, for large scale audio broadcasts in a community of diverse users, it may be difficult to have substantial adoption of new technologies in the short term. Moreover, even sophisticated users may be resistant to adopting multiple software applications for differing applications. In short, if you have a large community, you are likely to see a large number of missing users in audio broadcast with typical approaches.

Figure 2:
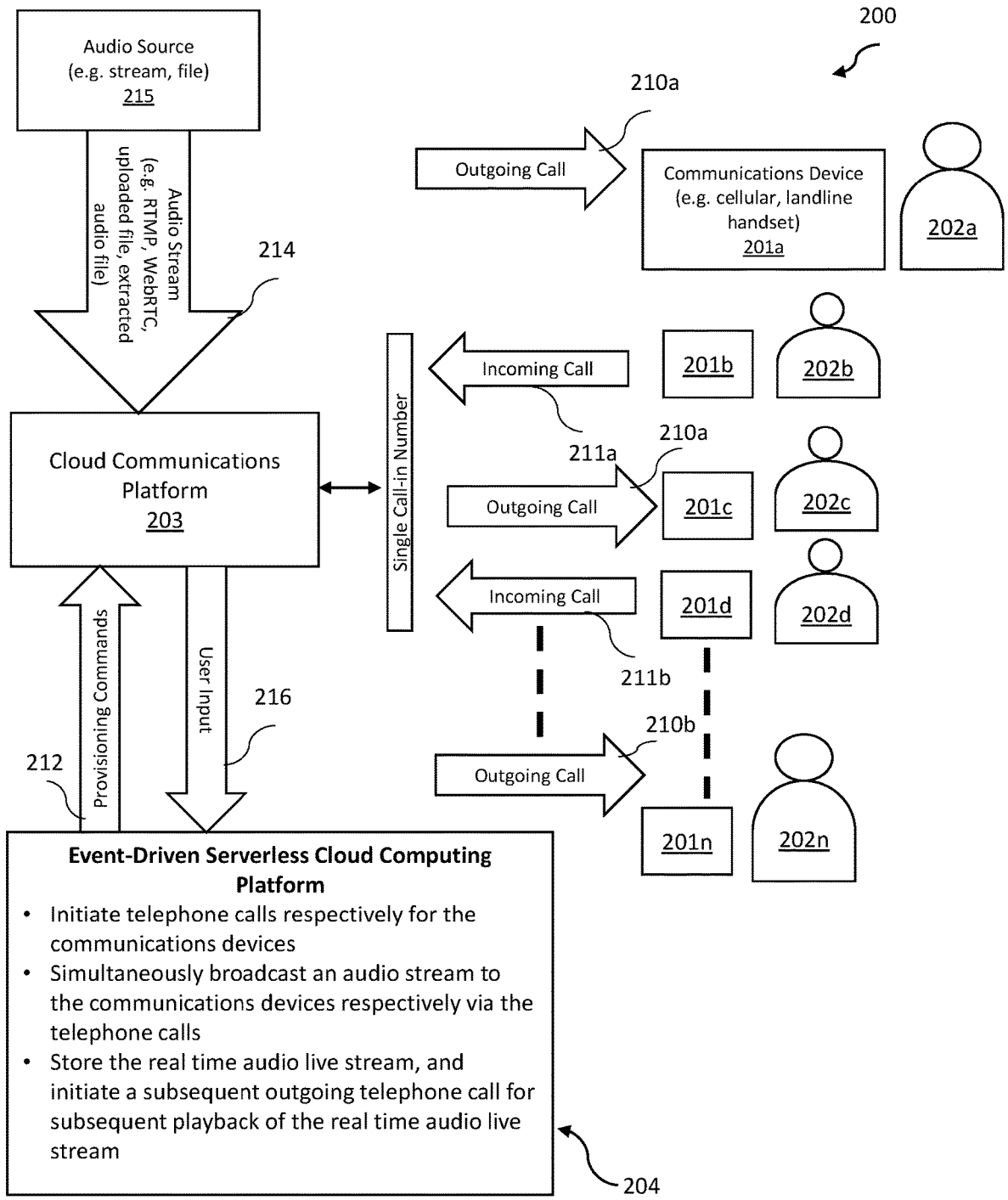
FIG. 2 is a schematic diagram of an audio broadcast system, according to the present disclosure.

Referring now to FIG. 2, an audio broadcast system 200 according to the present disclosure is now described. Helpfully, the audio broadcast system 200 may provide an approach for large scale audio broadcast to users with typical telephone devices. Also, the audio broadcast system 200 may provide an approach for audio broadcast to a large number of less sophisticated users, who may prefer the simplicity of a typical telephone device.

The audio broadcast system 200 illustratively includes a plurality of communications devices 201a-201n with an associated plurality of users 202a-202n. For example, the plurality of communications devices 201a-201n may comprise a mobile cellular device, a landline handset device, or a tablet computing device. Indeed, any device that can receive telephone calls (i.e. telephone calls directed to a telephone number) may be used.

The audio broadcast system 200 illustratively includes a cloud communications platform 203 in communication with the plurality of communications devices 201a-201n. As will be appreciated, the cloud communications platform 203 may comprise a cloud telephony service platform, such as a CPaaS (e.g. Twilio, or SignalWire).

The audio broadcast system 200 illustratively includes an event-driven serverless cloud computing platform 204 in communication with the plurality of communications devices 201a-201n (via the cloud communications platform 203) and the cloud communications platform 203. For example, the event-driven serverless cloud computing platform 204 may comprise the Amazon Web Services Lambda Platform.

The event-driven serverless cloud computing platform 204 is configured to provision resources from the cloud communications platform 203 to initiate a plurality of telephone calls 210a-210b, 211a-211b respectively for the plurality of communications devices 201a-201n. In particular, the event-driven serverless cloud computing platform 204 is configured to send provisioning commands 212 to the cloud communications platform 203 to generate the plurality of telephone calls 210a-210b, 211a-211b. In particular, the plurality of telephone calls 210a-210b, 211a-211b is associated with a corresponding plurality of telephone numbers. For example, in some embodiments, the provisioning commands 212 may comprise HTTP post request messages.

Also, the plurality of telephone calls 210a-210b, 211a-211b illustratively comprises a plurality of incoming telephone calls 211a-211b, and a plurality of outgoing telephone calls 210a-210b. As will be appreciated, each of the communications devices 201a-201n is provisioned a separate and dedicated telephone audio connection (i.e. a typical digital phone call) to the cloud communications platform 203. In the illustrated embodiments, the communications devices 201a-201n connected via the plurality of incoming telephone calls 211a-211b use a single call-in telephone number 213. In other words, the event-driven serverless cloud computing platform 204 is configured to initiate the plurality of incoming telephone calls 211a-211b from the single call-in telephone number 213. As will be appreciated, this arrangement is convenient for the users 202a-202n, enabling easy to remember dial-in information without cumbersome identification codes and passwords.

The event-driven serverless cloud computing platform 204 is configured to simultaneously broadcast an audio stream 214 to the plurality of communications devices 201a-201n respectively via the plurality of telephone calls 210a-210b, 211a-211b. In the illustrated embodiment, the audio broadcast system 200 includes an audio source 215 configured to transmit the audio stream to the cloud communications platform 203.

In some embodiments, the audio source 215 is configured to communicate with the cloud communications platform 203 via a telephone call. In other words, the audio source 215 may call into the cloud communications platform 203 to start the broadcast (e.g. using a private call-in number for security purposes). Here, the broadcast user (not shown) is the only one with an audio input function for the respective call. The users 202a-202n receiving the broadcast have only an audio output function for their respective telephone calls 210a-210b, 211a-211b.

Although the illustrated embodiment shows a single audio source 215, it should be appreciated that a number of simultaneous audio sources can be supported, each broadcasting to a separate set of users 202a-202n. Indeed, in these embodiments, each of the number of simultaneous audio sources can be assigned an access code for users 202a-202n to input to identify affiliation, and/or each of the number of simultaneous audio sources can be assigned respective single call-in telephone numbers 213.

The event-driven serverless cloud computing platform 204 is configured to receive the audio stream 214 as a real time audio live stream. For example, the real time audio live stream may comprise one of an RTMP feed and a WEBRTC feed. In some embodiments, the real time audio live stream can comprise an extracted audio stream file from an associated video stream (e.g. YouTube live stream, FaceBook live stream). Also, the audio stream 214 may be sourced from another periodic subscriber based audio source, such as an audio podcast. In particular, when a new podcast is released, the event-driven serverless cloud computing platform 204 is configured to download the new podcast audio file (e.g. mp3 file) and broadcast the same as the audio stream 214. In some embodiments, this third party automatic importing of the audio files is accomplished with software automation conduits, such as Zapier Online Automation Tool, for example.

Also, the event-driven serverless cloud computing platform 204 may be configured to receive the audio stream 214 as at least one of an uploaded audio file, and an extracted audio file from an associated video file. When the audio stream 214 is sourced from an existing file upload, the event-driven serverless cloud computing platform 204 may be configured to schedule the future broadcast.

The event-driven serverless cloud computing platform 204 is configured to, when the real time audio live stream begins, provision resources from the cloud communications platform 203 to initiate a plurality of notification outgoing telephone calls to subscribed communications devices from the communications devices 201a-201n. In other words, the audio broadcast system 200 reaches out automatically to subscribed users 202a-202n when the broadcast begins.

A given user 202a-202n may subscribe their respective communications device 201a-201n by dialing the single call-in telephone number 213. The event-driven serverless cloud computing platform 204 is configured to prompt the given user 202a-202n with an option to subscribe via a user input 216 (e.g. IVR). The event-driven serverless cloud computing platform 204 is configured to provide a user interface (e.g. web interface) for subscribing, which is separate from the call-in subscribing method noted above. In some embodiments, the event-driven serverless cloud computing platform 204 is configured to provide an administrative interface, and telephone numbers of the communications devices 201a-201n are added to the subscriber list (i.e. bulk subscriber list). Also, the event-driven serverless cloud computing platform 204 may be configured to import subscriber lists from third party software packages, and other file formats, such as a comma separated value (CSV) table.

Also, the event-driven serverless cloud computing platform 204 may be configured to, after initiating a given outgoing telephone call, require a user input 216 (e.g. IVR) before broadcast of the audio stream 214. For example, the user input 216 may comprise a spoken user input processed via voice recognition by the event-driven serverless cloud computing platform 204, or a touch tone user key input, such as dual tone multi-frequency tones. As will be appreciated, this will permit subscribed users to decline the current broadcast of the audio stream 214.

In some embodiments, the event-driven serverless cloud computing platform 204 is configured to store the real time audio live stream. The event-driven serverless cloud computing platform 204 is configured to provision resources from the cloud communications platform 203 to initiate a subsequent outgoing telephone call for subsequent playback of the real time audio live stream. For example, if a user 202a-202n calls in subsequent to the live broadcast, the event-driven serverless cloud computing platform 204 is configured to provide for subsequent playback. In other words, if the user 202a-202n missed the live broadcast, the user can later hear a playback of the same broadcast. For subscribed users 202a-202n, the event-driven serverless cloud computing platform 204 is configured to periodically provision notification outgoing telephone calls to subscribed communications devices (e.g. 1 per day). Of course, via the user input 216, the user 202a-202n may dismiss the current notification.

Another aspect is directed to a method of operating an audio broadcast system 200 comprising a plurality of communications devices 201a-201n, a cloud communications platform 203 in communication with the plurality of communications devices, and an event-driven serverless cloud computing platform 204 in communication with the plurality of communications devices and the cloud communications platform. The method comprises operating the event-driven serverless cloud computing platform 204 to provision resources from the cloud communications platform 203 to initiate a plurality of telephone calls 210a-210b, 211a-211b respectively for the plurality of communications devices 201a-201n, and simultaneously broadcast an audio stream 214 to the plurality of communications devices respectively via the plurality of telephone calls.

Figure 3:
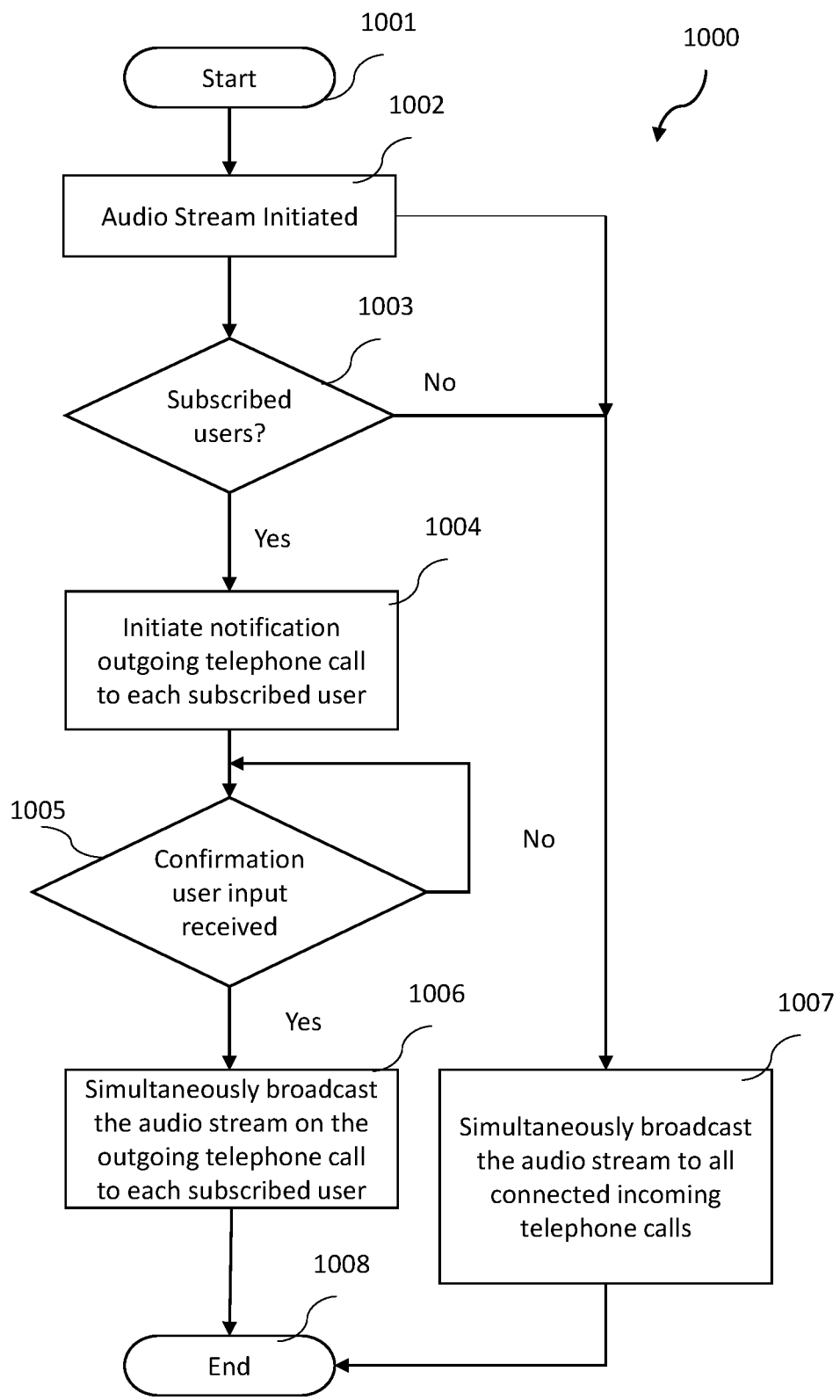
FIG. 3 is flowchart illustrating operation of the audio broadcast system of FIG. 2.

Referring now additionally to FIG. 3 and a flowchart 1000 therein, the operation of the audio broadcast system 200 is now described, which begins at Block 1001. At Block 1002, the audio stream 214 is initiated with the event-driven serverless cloud computing platform 204 at Block 1002. At Block 1003, the event-driven serverless cloud computing platform 204 is configured to determine whether there are any subscribed users 202a-202n for the associated audio source 215. If there are no subscribed users 202a-202n, the event-driven serverless cloud computing platform 204 is configured to simultaneously broadcast the audio stream 214 to all connected incoming telephone calls at Block 1007 and end at Block 1008. If there are subscribed users 202a-202n, the event-driven serverless cloud computing platform 204 is configured to initiate a notification outgoing telephone call to each subscribed user at Block 1004. Once the notification outgoing telephone call is connected and a user input 216 is received, the event-driven serverless cloud computing platform 204 is configured to simultaneously broadcast the audio stream 214 on the outgoing telephone call to each subscribed user 202a-202n at Blocks 1005-1006. The operation ends at Block 1008.

In FIGS. 5A-5C, the logical flow of operations for an example embodiment of the audio broadcast system 200 is illustrated. Compared to typical web video conference broadcast platforms, such as Zoom, for example, the communication system 100 provides the following:

- the communication system provides a unique direct dial phone number for only your broadcast. Zoom provides you a shared phone number with a unique meeting code.
- the communication system provides an upgrade to a toll-free number for $10 per month extra. Zoom costs $100 per month extra for a toll-free number.
- the communication system automatically records your live stream.
- the communication system plays back your most recent live stream if a caller calls back after you went live. The communication system will automatically replace the playback every time you go live. Zoom only broadcasts live, and then gives you a recording to download.
- the communication system greets callers with your personalized name. Everything is your brand. Depending on your plan, you may have Zoom branding in your greeting.
- the communication system provides notifications so that callers can elect to receive calls every time you go live that will put them right into the live stream when they answer. Zoom has calendar alerts for meetings.
- the communication system is not for meetings when you want many callers to talk, instead of just one (i.e. broadcast).
- the communication system does not do video, chat or files, just simply audio. Zoom has a robust platform for interactive meetings.
- the communication system can host up to 250 callers. Zoom ranges from 100 (Free) to 1,000 ($1,000/month) callers depending on plan.

In the following, an exemplary call flow within the communication system 100 is now discussed.

Business Phone Number: (111) 111-1111
Customer's Phone Number: (222) 222-2222
The business has our Smart Talk phone system installed. They have a simple IVR menu, such as press 1 for Dave in sales, press 2 for Sue in support.
Dave wants calls sent to his cellphone at (333) 333-3333 and Sue wants calls sent to her cellphone at (444) 444-4444
The customer is using any other phone device, such as a consumer grade cellphone with AT&T service.
Incoming Call Scenario
1) The customer dials the business's phone number.
2) AT&T routes their call to Smart Talk, Via Twilio/Signal Wire.
3) Twilio/SignalWire access the Smart Talk app via HTTP post request message.
4) Smart Talk receives the HTTP post request message using AWS API Gateway, and executes AWS Lambda functions to announce the IVR menu.
5) The customer wants to talk to Dave, so they press 1.
6) Smart Talk receives the HTTP post request message from Twilio/SignalWire that the customer pressed 1, via AWS API Gateway, and executes another AWS Lambda function to determine where to send the call (333) 333-3333.
7) Smart Talk places a call, via Twilio/SignalWire to Dave's cellphone at (333) 333-3333 and announces that this is a business call and asks him to accept it by pressing 1.
8) Dave presses 1.
9) Smart Talk receives the HTTP post request message from Twilio/SignalWire that the customer pressed 1, via AWS API Gateway, and executes another AWS Lambda function connect the customer with Dave.
10) Dave determines that Sue can better service the customer, so Dave presses the * key.
11) Smart Talk receives the HTTP post request message from Twilio/SignalWire that the customer pressed *, via AWS API Gateway, and executes another AWS Lambda function ask Dave what action he wants to take.
12) Dave selects to warm transfer the call, and enters Sue's extension(2).
13) Smart Talk receives the HTTP post request message from Twilio/SignalWire that the customer pressed 2, via AWS API Gateway, and executes another AWS Lambda function connect Sue with Dave & the customer.
14) Sue accepts the call by pressing 1.
15) Smart Talk receives the HTTP post request message from Twilio/SignalWire that the customer pressed 1, via AWS API Gateway, and executes another AWS Lambda function ask Dave what action he wants to take.
16) Sue is connected with Dave & Customer.
17) Dave explains the situation.
18) Dave hangs up, Sue & the customer continue to talk.
19) The customer hangs up.

Outgoing Call

To make an outgoing call, call the business phone number. Smart Talk will detect that you are a known user of this phone system and present you with some options, such as to record a voicemail greeting, dial an extension, or call out. Select to call out and enter the phone number you wish to dial.

In an exemplary embodiment of the communication system 100, the following technology stack is used, and is advantageous for a couple reasons. Firstly, this embodiment is almost entirely pay-per-usage with no or limited pre-provisioning to handle load. Secondly, this embodiment is 100% on-demand scalable. This is due to each phone call having its own functions, and the cloud telephone communications application can start as many functions as needed at a moment notice (upon incoming/outgoing phone calls). Thirdly, Ruby w/ Active Support is similar to Ruby on Rails, which is a very common language with developers. Finding programming talent should be easier because of the abstraction of the serverless concepts into ruby. Fourthly, Nuxt framework is built on Vue, which is a cutting-edge website app framework. So, while building a 100% scalable website, the cloud telephone communications application is just using JavaScript, which is again a common language and should be easier to find talent to support. All while using AWS to deliver out site with-out provisioning to handle load.

Amazon Web Services

Route 53
   DNS Host & Reg for domains—used to reference API called by Twilio/SignalWire S3
   Hosts recordings (voicemail greetings, voicemail messages, welcome greetings, call recordings)
   Management interface front-end Lambda
   Serverless functions for PBX app, written on Serverless Framework in ruby
   Also functions for management interface back-end API Gateway
   Receives requests for HTTP post request message/GET and executes given AWS Lambda function as requested.

Dynamo DB
   Database for the PBX and management app
   Tables:
     Admins
     Affiliates
     Contacts
     Custom responses
     Live servers
     Live stream logs
     Live events
     Notifications
     Notification CSV Uploads
     Organizations
     Phone Systems
     Playbacks
     Groups
     Calls
     Texts
     Users
     Voicemails
     Plans
     Memberships
     Providers
     Response Logs
     Service times
     Keywords
     Sessions
     Signups
     SMS contacts
     SMS unsubscribe
     Texts CloudFront
   Management app CDN CloudWatch
   Helps record logs and alerts from AWS lambda function executions CodeCommit
   Git source code repository Twilio Programmable Wireless
   IOT Service used with cellphones to route calls into our PBX SignalWire Voice Service
   Handles Call backend for incoming and outgoing calls
     Messaging Service
   Handles phone numbers for our app to use Phone Number Service
   Hosts phone numbers for our app to use

SIP

Serverless Framework
   We use this to help setup and manage our serverless apps (PBX, management app)

Ruby
   Version
     2.5.5
   Gems
     dynamoid
     activesupport
     signalwire
     Twilio-ruby
     aws-sdk-ses
     aws-sdk-ssm
     jwt
     slack-incoming-webhooks
     rest-client JavaScript The disclosed embodiments use the Nuxt framework to produce the front-end of our management app. The files produced are stored on AWS S3 and delivered with AWS CloudFront.

In an exemplary embodiment of the communication system 100, the following feature set is provided.

Calls
   Welcome greeting & menu options
     Dynamic text-to-voice option or record your own audio
   Extensions
     To users
     To groups
       Voicemail extension
   Users
     each have cellphone & email
     all calls directed for this user (or group user is in) goes to their cellphone
     all text messages directed for this user goes to their cellphone
   Groups
     Add users to groups
     Groups can have an extension
       Dial everyone, first one to answer gets call If marked as voicemail extension: this extension grows straight to voicemail and sends it to users of this group (text or email)

Dial out using business's number on your cellphone

Voicemail
  Each user & group can setup their voicemail greeting
  Voicemail recordings can be sent by email and text
  Voicemail recordings are transcribed
  Text-to-voice or record your own audio voicemail greeting Warm Transfer incoming calls Conference call No hardware, uses only users' cellphones
  No app, no data plan, no smartphone needed Unlimited Lines: Every user can use the phone system as the same time Text Messages
  Receive text messages sent to your business's phone number
  Respond to text messages sent to your business's number
  Setup keywords
    If text contains just keyword, it will respond will auto-response
  Get voicemails delivered by text message In some embodiments, the communication system 100 includes an end-to-end phone solution, from the handset, infrastructure, and the PBX. In these embodiments, the operator of the cloud telephone communications application can charge 1 monthly fee for the handset, infrastructure and PBX features, on a month-to-month contract, per line or user. No other solution has an all-in-one solution to business phones. They provide an application (that requires a mobile phone and cellular plan to run), or require another device (sip desktop aps) or wired infrastructure (desk phone) to use.

Some embodiments include a desk phone setup that works with or through the cellular device so that you can use a native feeling call setup, and then just take the cellphone with you when you leave. On the infrastructure side, a current phone setup normally includes a bunch of wired desk phones, that go thru a switch, to a router, sometimes with an onsite PBX (or "cloud" hosted), and then use your internet connection. With the disclosed embodiment, the user doesn't need any of that. Using cellular LTE connectivity, business phone can be placed anywhere, anytime, and configured for any reason, without re-wiring, worrying about network configuration or internet ability (think mobile or seasonal businesses).

The communication system 100 may provide an approach to the following problems with typical phone systems. Because Smart Talk is almost entirely pay-per-usage, and uses cutting edge technologies, we can pass along a great cost savings to our customers or allow a licensor to generate cost savings. The disclosed embodiments operate at about 1/10th the cost of normal operations of regular business VOIP competitors.

The disclosed embodiments have near infinite scalability because they are deployed in the cloud. Also, since the disclosed embodiments are serverless, we can stand up as many or as few functions as we need, without any notice. A business telephone system is composed of three layers, the handset, the infrastructure, and the PBX. Normally, in a business situation, you must buy and configure each one separate—or pay an upcharge to have them configured together. The disclosed embodiments provide the entire solution for business phone to our customers.

Most solutions today require applications and smart phones. These don't integrate with Bluetooth because of they aren't the native dialer (for dialing out). Because we use the regular phone service off any phone, functionality and usability is greatly increased.

Infrastructure today for desk phones requires wiring to your desk from a switch with enough ports, connected to a router configured with a VLAN for security and QoS, and then over your single internet connection (which we hope never drops) to the cloud. Some companies even have on-site PBX, which brings more complexity to the picture.

Today, most businesses operate with a wired desk phone and a cellular phone—if needed. These approaches include double billing, double phone numbers, and configuration are issues. The disclosed embodiments provide a unified business phone setup that can be mobile when desired and can provide business class functionality when desired.

In some embodiments of the communication system 100, all data is encrypted at 1024 bits or greater at rest (dynamo database keys) and in transit (Secure Sockets Layer). Our most sensitive data (anything with Personally Identifiable Information (PII) or passwords) is encrypted twice (by JSON Web Token (JWT) keys). Once by AWS, and once by us. Every call to our application over HTTP (POST, GET, DELETE, PUT, HEAD, PATCH) is done over AWS provided SSL Certs (AWS Certificate Manager) on RSA 2048-bit encryption. Our app matches or exceeds bank level security recommendations.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An audio broadcast system comprising:
a plurality of communications devices;
a cloud communications platform in communication with said plurality of communications devices; and
an event-driven serverless cloud computing platform in communication with said plurality of communications devices and said cloud communications platform;
said event-driven serverless cloud computing platform configured to
receive a real time audio live stream,
provision resources from said cloud communications platform to initiate a plurality of telephone calls respectively for said plurality of communications devices,
when the real time audio live stream begins, provision resources from said cloud communications platform to initiate at least one notification outgoing telephone call to at least one given subscribed communications device from the plurality of communications devices, and
simultaneously broadcast the real time audio live stream to said plurality of communications devices respectively via said plurality of telephone calls.

2. The audio broadcast system of claim 1 wherein said event-driven serverless cloud computing platform is configured to store the real time audio live stream, and provision resources from said cloud communications platform to initiate at least one subsequent outgoing telephone call for subsequent playback of the real time audio live stream.

3. The audio broadcast system of claim 1 wherein the real time audio live stream comprises at least one of a Real-Time Messaging Protocol (RTMP) feed and a Web Real-Time Communication (WebRTC) feed.

4. The audio broadcast system of claim 1 wherein the plurality of telephone calls comprises a plurality of incoming telephone calls, and a plurality of outgoing telephone calls.

5. The audio broadcast system of claim 4 wherein said event-driven serverless cloud computing platform is configured to initiate the plurality of incoming telephone calls from a single call-in telephone number.

6. The audio broadcast system of claim 4 wherein said event-driven serverless cloud computing platform is configured to, after initiating a given outgoing telephone call, require a user input before broadcast of the real time audio live stream.

7. The audio broadcast system of claim 1 wherein said event-driven serverless cloud computing platform comprises Amazon Web Services Lambda Platform.

8. An audio broadcast system comprising:
a cloud communications platform in communication with a plurality of communications devices; and
an event-driven serverless cloud computing platform in communication with the plurality of communications devices and said cloud communications platform;
said event-driven serverless cloud computing platform configured to
receive a real time audio live stream,
provision resources from said cloud communications platform to initiate a plurality of telephone calls respectively for the plurality of communications devices, the plurality of telephone calls comprising a plurality of incoming telephone calls, and a plurality of outgoing telephone calls, each communications device being provisioned a separate and dedicated telephone audio connection to said cloud communications platform,
when the real time audio live stream begins, provision resources from said cloud communications platform to initiate at least one notification outgoing telephone call to at least one given subscribed communications device from the plurality of communications devices, and
simultaneously broadcast the real time audio live stream to the plurality of communications devices respectively via said plurality of telephone calls.

9. The audio broadcast system of claim 8 wherein said event-driven serverless cloud computing platform is configured to store the real time audio live stream, and provision resources from said cloud communications platform to initiate at least one subsequent outgoing telephone call for subsequent playback of the real time audio live stream.

10. The audio broadcast system of claim 8 wherein the real time audio live stream comprises at least one of a Real-Time Messaging Protocol (RTMP) feed and a Web Real-Time Communication (WebRTC) feed.

11. The audio broadcast system of claim 8 wherein said event-driven serverless cloud computing platform is configured to initiate the plurality of incoming telephone calls from a single call-in telephone number.

12. The audio broadcast system of claim 8 wherein said event-driven serverless cloud computing platform is configured to, after initiating a given outgoing telephone call, require a user input before broadcast of the real time audio live stream.

13. The audio broadcast system of claim 8 wherein said event-driven serverless cloud computing platform comprises Amazon Web Services Lambda Platform.

14. A method of operating an audio broadcast system comprising a plurality of communications devices, a cloud communications platform in communication with the plurality of communications devices, and an event-driven serverless cloud computing platform in communication with the plurality of communications devices and the cloud communications platform, the method comprising:
operating the event-driven serverless cloud computing platform to
receive a real time audio live stream,
provision resources from the cloud communications platform to initiate a plurality of telephone calls respectively for the plurality of communications devices,
when the real time audio live stream begins, provision resources from the cloud communications platform to initiate at least one notification outgoing telephone call to at least one given subscribed communications device from the plurality of communications devices, and
simultaneously broadcast the real time audio live stream to the plurality of communications devices respectively via the plurality of telephone calls.

15. The method of claim 14 further comprising operating the event-driven serverless cloud computing platform to store the real time audio live stream, and provision resources from the cloud communications platform to initiate at least one subsequent outgoing telephone call for subsequent playback of the real time audio live stream.

16. The method of claim 14 wherein the real time audio live stream comprises at least one of a Real-Time Messaging Protocol (RTMP) feed and a Web Real-Time Communication (WebRTC) feed.

17. The method of claim 14 wherein the plurality of telephone calls comprises a plurality of incoming telephone calls, and a plurality of outgoing telephone calls.

18. The method of claim 17 further comprising operating the event-driven serverless cloud computing platform to initiate the plurality of incoming telephone calls from a single call-in telephone number.

19. The method of claim 14 further comprising operating the event-driven serverless cloud computing platform to, after initiating a given outgoing telephone call, require a user input before broadcast of the real time audio live stream.

20. The method of claim 14 wherein the event-driven serverless cloud computing platform comprises Amazon Web Services Lambda Platform.

* * * * *